United States Patent
Liu et al.

(10) Patent No.: US 11,444,915 B2
(45) Date of Patent: Sep. 13, 2022

(54) SERVICE OBTAINING AND PROVIDING METHODS, USER EQUIPMENT, AND MANAGEMENT SERVER

(71) Applicant: Huawei Technologies Co., Ltd., Shenzhen (CN)

(72) Inventors: Bingyang Liu, Beijing (CN); Zhe Chen, Beijing (CN); Shihui Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/009,207

(22) Filed: Sep. 1, 2020

(65) Prior Publication Data
US 2020/0396202 A1 Dec. 17, 2020

Related U.S. Application Data

(63) Continuation of application No. PCT/CN2019/076122, filed on Feb. 26, 2019.

(30) Foreign Application Priority Data

Mar. 2, 2018 (CN) .......................... 201810176027.4

(51) Int. Cl.
*H04L 29/12* (2006.01)
*H04L 29/08* (2006.01)
(Continued)

(52) U.S. Cl.
CPC ...... *H04L 61/5007* (2022.05); *H04L 61/4511* (2022.05); *H04L 67/51* (2022.05)

(58) Field of Classification Search
CPC ... H04L 61/2007; H04L 61/1511; H04L 67/16
See application file for complete search history.

(56) References Cited

U.S. PATENT DOCUMENTS

2004/0186850 A1* 9/2004 Chowdhury ........ H04L 61/4541
707/999.102
2010/0023617 A1* 1/2010 Tremaine ............ H04L 61/5046
709/224
(Continued)

FOREIGN PATENT DOCUMENTS

CN 102843445 A 12/2012
CN 102855334 A 1/2013
(Continued)

OTHER PUBLICATIONS

OPENDNS, "What"s an average # of Daily DNS requests? 83k?! Network compromised?!," Oct. 10, 2016, Retrieved from the internet:https://support.opendns.com/hc/en-us/community/posts/220112648-What-s-an-average-of-Daily-DNS-requests-83k-Network-compromised, 3 pages.
(Continued)

*Primary Examiner* — Christopher B Robinson
(74) *Attorney, Agent, or Firm* — Slater Matsil, LLP

(57) ABSTRACT

This application provides service obtaining and providing methods, user equipment, and a management server. The service obtaining method includes: determining, by user equipment, a first Internet protocol IP address by using a preset algorithm based on a service name of a to-be-accessed service; sending, by the user equipment, a communication data packet by using the first IP address as a destination address; and receiving, by the user equipment, the service provided by a serving-end device.

9 Claims, 8 Drawing Sheets

(51) Int. Cl.
*H04L 61/5007* (2022.01)
*H04L 61/4511* (2022.01)
*H04L 67/51* (2022.01)

(56) References Cited

U.S. PATENT DOCUMENTS

| | | | |
|---|---|---|---|
| 2011/0035437 A1* | 2/2011 | Toumura | H04L 61/4511 709/203 |
| 2012/0136984 A1* | 5/2012 | Wang | H04L 67/1061 709/223 |
| 2012/0163298 A1* | 6/2012 | Zhou | H04L 69/22 370/328 |
| 2013/0046864 A1* | 2/2013 | Behringer | H04L 61/5038 709/220 |
| 2013/0201987 A1* | 8/2013 | Lu | H04L 45/74 370/392 |
| 2013/0272303 A1* | 10/2013 | Kamble | H04L 45/74 370/392 |
| 2014/0244794 A1* | 8/2014 | Nakadai | H04L 67/104 709/217 |
| 2014/0267581 A1 | 9/2014 | Cronin | |

FOREIGN PATENT DOCUMENTS

| | | | | |
|---|---|---|---|---|
| CN | 103581740 A | | 2/2014 | |
| CN | 105376347 A | | 3/2016 | |
| CN | 106657256 A | | 5/2017 | |
| CN | 106790623 A | | 5/2017 | |
| CN | 111869178 A | * | 10/2020 | ........... H04L 61/203 |
| KR | 20160009372 A | * | 1/2016 | |
| WO | WO-2016154217 A1 | * | 9/2016 | ......... H04L 61/6022 |

OTHER PUBLICATIONS

Forrest, B., "Bing and Google Agree: Slow Pages Lose Users," Jun. 23, 2009, Retrieved from the internet:http://radar.oreilly.com/2009/06/bing-and-google-agree-slow-pag.html, 3 pages.

Wang, X. S. et al.,"Demystifying Page Load Performance with Wprof," 10th USENIX Symposium on Networked Systems Design and Implementation (NSDI 13), pp. 473-485.

Park, K. et al., "CoDNS: Improving DNS Performance and Reliability via Cooperative Lookups," OSDI 04: 6th Symposium on Operating Systems Design and Implementation, pp. 199-214.

Einav, Y., "Amazon Found Every 100ms of Latency Cost them 1% in Sales," Jan. 20, 2019, Retrieved from the internet:https://www.gigaspaces.com/blog/amazon-found-every-100ms-of-latency-cost-them-1-in-sales/, 6 pages.

An, D., "Find out how you stack up to new industry benchmarks for mobile page speed", Feb. 2017, Retrieved from the internet:https://www.thinkwithgoogle.com/marketing-strategies/app-and-mobile/mobile-page-speed-new-industry-benchmarks/, total 11 pages.

Davoli, R., "IPv6 Hash-Based Addresses for Simple Network Deployment," The Fifth International Conference on Advances in Future Internet (IFIN), Jan. 1, 2013, pp. 15-20.

* cited by examiner

SERVICE OBTAINING AND PROVIDING METHODS, USER EQUIPMENT, AND MANAGEMENT SERVER

CROSS-REFERENCE TO RELATED APPLICATIONS

This application is a continuation of International Application No. PCT/CN2019/076122, filed on Feb. 26, 2019, which claims priority to Chinese Patent Application No. 201810176027.4, filed on Mar. 2, 2018. The disclosures of the aforementioned applications are hereby incorporated by reference in their entireties.

TECHNICAL FIELD

This application relates to the communications field, and more specifically, to service obtaining and providing methods, user equipment, and a management server.

BACKGROUND

Currently, more and more network applications, especially network applications such as virtual reality (VR) and augmented reality (AR), have very strict requirements on a network delay. Therefore, a multiple-access edge computing (MEC) technology may also be referred to as a mobile edge computing technology in a mobile scenario, and is proposed to achieve a low delay. A basic idea of the MEC technology is to deploy a service or content at a network edge closer to user equipment, instead of at a cloud server far away from the user equipment, thereby achieving a lower delay by using a shorter transmission distance.

In the MEC technology, usually a plurality of MEC subnets are deployed, and each MEC subnet has a lot of serving-end devices, namely, MEC stations. A service or content is deployed in these serving-end devices. In consideration of a local feature and a deployment policy of a service, a service may be deployed in a plurality of MEC subnets, but is unnecessarily deployed in all the MEC subnets. From a perspective of user equipment, when accessing a service, the user equipment always expects to access a serving-end device having a lowest delay. However, the serving-end device having the lowest delay does not necessarily exist in an MEC subnet nearest to the user. Therefore, the user equipment needs to query a nearest serving-end device in a network. This process is completed by using a domain name system (DNS) protocol. The user equipment initiates a DNS request to a DNS server, to query an Internet protocol (IP) address corresponding to a service name (which usually may be a domain name). The DNS server responds to the user equipment with an IP address corresponding to a serving-end device. The DNS server may select, for the user equipment, a serving-end device nearest to the user equipment; and return an IP address of the serving-end device.

The foregoing query process needs to consume a time, and a generated delay is approximately: (air interface delay for sending the DNS request+fixed network delay)+processing delay of the DNS server+(air interface delay for sending a DNS response+fixed network delay). In other words, a long time has already been consumed before the user equipment actually initiates a communication connection to the serving-end device. This increases an overall delay of an application service and reduces user experience.

SUMMARY

This application provides service obtaining and providing methods, user equipment, and a management server, to reduce an overall delay of an application service, thereby improving user experience.

According to a first aspect, this application provides a service obtaining method. The method may include: determining, by user equipment, a first Internet protocol IP address by using a preset algorithm based on a service name of a to-be-accessed service; sending, by the user equipment, a communication data packet by using the first IP address as a destination address; and receiving, by the user equipment, the service provided by a serving-end device.

According to the service obtaining method in the first aspect, the user equipment determines the IP address for the service name of the to-be-accessed service by using the preset algorithm, sends the communication data packet by using the IP address as a destination address, and receives the service provided by the serving-end device. This prevents a long delay caused because the user equipment queries the IP address from a DNS server, and can reduce an overall delay of an application service, thereby improving user experience.

In a possible implementation of the first aspect, the determining, by user equipment, a first IP address by using a preset algorithm based on a service name of a to-be-accessed service may include: determining, by the user equipment, a service identifier by applying at least one of a hash algorithm and an encryption algorithm to the service name; and determining, by the user equipment, the first IP address based on the service identifier. In other words, the preset algorithm for determining the first service identifier (or the first IP address) corresponding to the first service name may be the hash algorithm, may be the encryption algorithm, or may be an algorithm obtained by combining the hash algorithm and the encryption algorithm. It should be understood that when the hash algorithm and/or the encryption algorithm are/is used to calculate a service identifier, the algorithm is simple and there is a relatively low probability that service identifiers (or IP addresses) obtained after calculation are repeated.

In a possible implementation of the first aspect, the determining, by user equipment, a first IP address by using a preset algorithm based on a service name of a to-be-accessed service may include: clipping, by the user equipment, a part out of the service name, to obtain a service identifier corresponding to the service name; and determining, by the user equipment based on the service identifier corresponding to the service name, the first IP address corresponding to the service name. It should be understood that when a service identifier is clipped out of a service name, calculation is simple and there is a relatively low probability that service identifiers (or IP addresses) obtained after calculation are repeated.

In a possible implementation of the first aspect, before the determining, by user equipment, a first IP address by using a preset algorithm based on a service name of a to-be-accessed service, the method may further include: determining, by the user equipment, that the service name is not in a conflict list, where the conflict list includes a correspondence between at least one pair of a service name and a first IP address. In this possible implementation, the conflict list is set to resolve a conflict problem. When the obtained IP address does not cause a conflict, the method in the first aspect is used.

In a possible implementation of the first aspect, the conflict list may be sent by a dynamic host configuration protocol DHCP server.

In a possible implementation of the first aspect, when the user equipment determines the first IP address by using the preset algorithm based on the service name of the to-be-accessed service, the method may further include: sending, by the user equipment, a query request to a domain name system DNS server, where the query request is used to request a second IP address of the serving-end device that provides the service. In this possible implementation, the user equipment is allowed to initiate a request to query an IP address from the DNS server when initiating communication by using a locally generated IP address as a destination address. In this way, even if a particular service is not deployed in a system architecture, delay experience not inferior to that in a conventional DNS resolution manner can still be obtained.

In a possible implementation of the first aspect, the first IP address may be an Internet protocol version 6 IPv6 address. In this possible implementation, an IPv6 address with a length of 128 bits is used. This can meet a requirement of an enormous quantity of services.

According to a second aspect, this application provides user equipment, configured to perform the method according to any one of the first aspect or the possible implementations of the first aspect. Specifically, the user equipment may include a module configured to perform the method according to any one of the first aspect or the possible implementations of the first aspect.

According to a third aspect, this application provides user equipment. The user equipment includes a processor and a memory. The memory is configured to store an instruction, and the processor is configured to execute the instruction stored in the memory, to enable the user equipment to perform the method according to any one of the first aspect or the possible implementations of the first aspect.

According to a fourth aspect, this application provides a service providing method. The method may include: determining, by a management server by using a preset algorithm, a first Internet protocol IP address corresponding to a first service name; and allocating, by the management server to a first serving-end device, the first IP address corresponding to the first service name, where the first serving-end device provides a service whose name is the first service name.

According to the service providing method in the fourth aspect, the management server determines a corresponding first IP address for each service name by using the preset algorithm, and allocates the first IP address to a first serving-end device corresponding to the service name. In this way, user equipment can determine a first IP address for a service name of a to-be-accessed service by using the same preset algorithm, sends a communication data packet by using the first IP address as a destination address, and receives the service provided by a serving-end device. This prevents a long delay caused because the user equipment queries the IP address from a DNS server, and can reduce an overall delay of an application service, thereby improving user experience.

In a possible implementation of the fourth aspect, the determining, by a management server by using a preset algorithm, a first IP address corresponding to a first service name may include: determining, by the management server by applying at least one of a hash algorithm and an encryption algorithm to the first service name, a first service identifier corresponding to the first service name; and determining, by the management server based on the first service identifier corresponding to the first service name, the first IP address corresponding to the first service name.

In a possible implementation of the fourth aspect, the determining, by a management server by using a preset algorithm, a first IP address corresponding to a first service name may include: clipping, by the management server, a part out of the first service name, to obtain a first service identifier corresponding to the first service name; and determining, by the management server based on the first service identifier corresponding to the first service name, the first IP address corresponding to the first service name.

In a possible implementation of the fourth aspect, before the allocating, by the management server to a first serving-end device, the first IP address corresponding to the first service name, the method may further include: determining, by the management server, that the first IP address corresponding to the first service name is not occupied by a serving-end device other than the first serving-end device.

In a possible implementation of the fourth aspect, the method may further include: determining, by the management server by using the preset algorithm, a first IP address corresponding to a second service name, where the first IP address corresponding to the first service name is the same as the first IP address corresponding to the second service name; determining, by the management server, that the first IP address corresponding to the second service name has already been occupied by the first serving-end device; allocating, by the management server, a third IP address to a second serving-end device, where the second serving-end device provides a service whose name is the second service name; and adding, by the management server, the second service name and the third IP address to a conflict list.

In a possible implementation of the fourth aspect, the conflict list may be configured in a dynamic host configuration protocol (DHCP) server.

In a possible implementation of the fourth aspect, the first IP address may be an Internet protocol version 6 (IPv6) address.

According to a fifth aspect, this application provides a management server, configured to perform the method according to any one of the fourth aspect or the possible implementations of the fourth aspect. Specifically, the management server may include a module configured to perform the method according to any one of the fourth aspect or the possible implementations of the fourth aspect.

According to a sixth aspect, this application provides a management server. The management server includes a processor and a memory. The memory is configured to store an instruction, and the processor is configured to execute the instruction stored in the memory, to enable the management server to perform the method according to any one of the fourth aspect or the possible implementations of the fourth aspect.

According to a seventh aspect, this application provides a service providing method. The method may include: receiving, by a gateway device, a router entry, where the router entry is used to indicate a correspondence between a serving-end device and a first Internet protocol IP address; and sending, by the gateway device, the router entry to another gateway device.

According to the service providing method in the seventh aspect, the gateway device notifies an adjacent (or a nearby) subnet of the router entry, so that a serving-end device in a current subnet can be routed from the adjacent (or nearby) subnet. In this way, when user equipment needs to access a service and initiate a connection to a serving-end device corresponding to a service name of the service, the user equipment may directly locally generate an IP address corresponding to the service name, and initiate a communication request to a subnet by using the IP address as a destination address of a communication data packet.

In a possible implementation of the seventh aspect, the receiving, by a gateway device, a router entry may include: receiving, by the gateway device, a router entry sent by the serving-end device.

In a possible implementation of the seventh aspect, the receiving, by a gateway device, a router entry may include: receiving, by the gateway device, a router entry sent by a management server.

In a possible implementation of the seventh aspect, the first IP address may be an Internet protocol version 6 IPv6 address.

According to an eighth aspect, this application provides a gateway device, configured to perform the method according to any one of the seventh aspect or the possible implementations of the seventh aspect. Specifically, the gateway device may include a module configured to perform the method according to any one of the seventh aspect or the possible implementations of the seventh aspect.

According to a ninth aspect, this application provides a gateway device. The gateway device includes a processor and a memory. The memory is configured to store an instruction, and the processor is configured to execute the instruction stored in the memory, to enable the gateway device to perform the method according to any one of the seventh aspect or the possible implementations of the seventh aspect.

According to a tenth aspect, this application provides a computer readable storage medium. The computer readable storage medium stores an instruction. When the instruction is run on a computer, the computer is enabled to perform the method according to any one of the first aspect, the fourth aspect, the seventh aspect, or the corresponding possible implementations.

According to an eleventh aspect, this application provides a computer program product that includes an instruction. When a computer runs the instruction of the computer program product, the computer is enabled to perform the method according to any one of the first aspect, the fourth aspect, the seventh aspect, or the corresponding possible implementations.

According to a twelfth aspect, this application provides a computer chip. The computer chip enables a computer to perform the method according to any one of the first aspect, the fourth aspect, the seventh aspect, or the corresponding possible implementations.

In this application, a service name is a name used to uniquely identify an object. The object may be a communication object, or may be an access object, for example, may be a network entity.

DETAILED DESCRIPTION OF ILLUSTRATIVE EMBODIMENTS

The following describes the technical solutions of this application with reference to the accompanying drawings.

User equipment (UE) in the embodiments of this application may also be referred to as a terminal, a mobile terminal, mobile subscriber equipment, or the like. The user equipment may communicate with one or more core networks by using a radio access network. The user equipment may be a mobile terminal such as a mobile phone (for example, a "cellular" phone), or a computer having a mobile terminal. For example, the user equipment may be a portable, pocket-sized, handheld, computer built-in, or vehicle-mounted mobile apparatus. The user equipment exchanges voice and/or data with the radio access network. This is not limited in the embodiments of this application. The user equipment may further perform communication by using a wireless local area network (WLAN) or each generation of (for example, 4G (the 4th generation), 5G, 3G, or 2G) mobile communications technology.

A management server in the embodiments of this application is configured to: provide a service provider with an interface for service deployment and registration, detect validity of a service name of a deployed service, and detect and process an IP address conflict problem or the like. The management server may cover a plurality of subnets and manage the plurality of subnets. The management server may be a plurality of servers physically. The servers may be deployed in a centralized manner or may be deployed in a distributed manner geographically.

In the embodiments of this application, a service name may be a name used to uniquely identify an object. The object may be a communication object, or may be an access object, for example, may be a network entity. In the embodiments of this application, the service name may include one or more of a domain name, a host name, a content name, and a service name. The service name may also include another name. This is not limited in the embodiments of this application.

The domain name is a name of a server or a network system in a network, and the domain name is unique all over the world. The domain name is in a form of a combination of several letters and numbers and is divided into several parts by ".". For example, IBM.com is a domain name. A range of the domain name is greater than that of the host name. One domain name may have a plurality of host names. For example, hosts: a server 1 and a server 2 exist under a domain name abc.com, and host names are server1.abc.com and server2.abc.com. The content name is used to indicate a name of specific content. For example, a content name of content "Sina comments" is news.sina.com.cn/opinion/. The service name is used to indicate a name of a specific service. For example, https://www.baidu.com/ is a service name.

In the embodiments of this application, a service may be a service in a mobile scenario, or may be a service in a non-mobile scenario.

Figure 1:
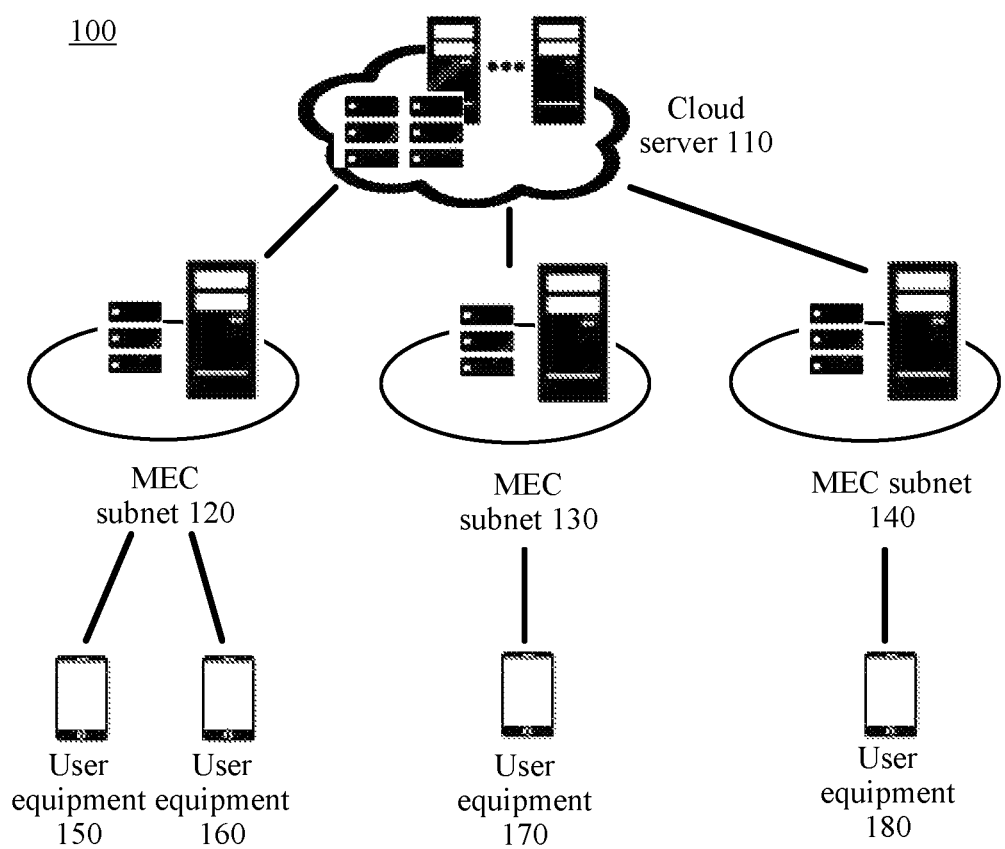
FIG. 1 is a schematic diagram of a scenario of an MEC technology.

FIG. 1 is a schematic diagram of a scenario 100 of an MEC technology. As shown in FIG. 1, a cloud server no does not provide a service directly for user equipment 150, user equipment 160, user equipment 170, and user equipment 180. Instead, the cloud server no provides a service indirectly for the user equipment 150, the user equipment 160, the user equipment 170, and the user equipment 180 by using an MEC subnet 120, an MEC subnet 130, and an MEC subnet 140. It should be understood that structures and quantities of cloud servers, MEC subnets, and user equipments in FIG. 1 are merely intended for an illustrative purpose, rather than limiting the embodiments of this application.

Figure 2:
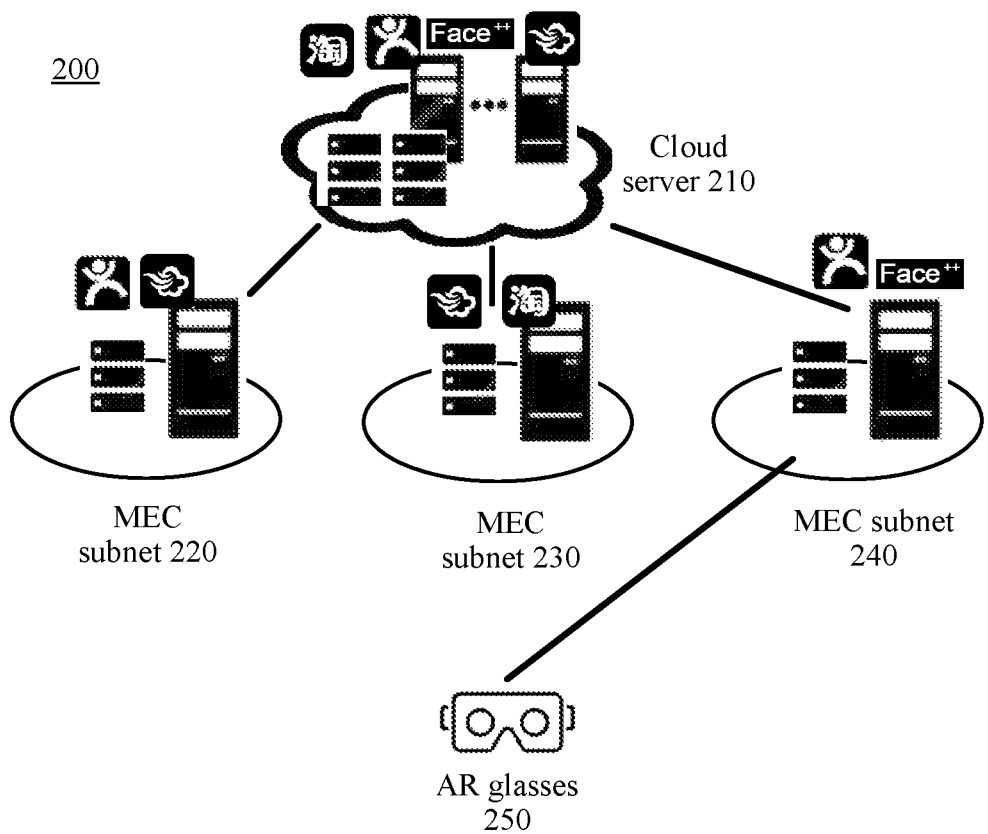
FIG. 2 is a schematic diagram of applying AR in an MEC scenario.

FIG. 2 is a schematic diagram of applying AR in an MEC scenario 200. As shown in FIG. 2, a cloud server 210 may provide services for applications such as Taobao, Dazhongdianping, Moji Weather, and Face++. A system provides services such as Dazhongdianping and Moji Weather by using an MEC subnet 220, provides services such as Moji Weather and Taobao by using an MEC subnet 230, and provides services such as Taobao and Face++ by using an MEC subnet 240. User equipment may be specifically AR glasses 250. The MEC subnet 230 is nearest to the AR glasses 250. It should be understood that structures and quantities of cloud servers, MEC subnets, applications, and user equipments in FIG. 2 are merely intended for an illustrative purpose, rather than limiting the embodiments of this application.

A user stands still, walks, or travels in a vehicle while wearing the AR glasses 250. When the user sees a bus, a route and a timetable of the bus are displayed on a screen of the AR glasses 250. When the user sees a restaurant, information about a menu of the restaurant is displayed on the screen of the AR glasses 250. When the user looks at the sky, weather information is displayed on the screen of the AR glasses 250. When the user sees a person entering an office, whether the person is a company employee or a temporary visitor can be recognized through facial recognition.

In an existing solution, if the AR glasses 250 require the Face++ application to provide a service, the AR glasses 250 need to initiate a DNS request to a DNS server through the MEC subnet 230, to query an IP address corresponding to Face++. The DNS server selects, for the AR glasses 250, a serving-end device that is nearest to the AR glasses 250 and that can provide the Face++ service, to be specific, a serving-end device that is in the MEC subnet 240 and that can provide the Face++ service; and returns an IP address (a globally unique IP address) of the serving-end device. This causes a long delay, resulting in poor user experience.

To eliminate a delay caused by the query in the DNS server, an existing solution is to statically configure a mapping relationship between a service name and an IP address (a globally unique IP address) in user equipment. Specifically, the mapping relationship may be configured in a HOSTS file of an operating system. When an application in the user equipment needs to access a service name, the user equipment first queries whether the service name exists in a local HOSTS file. If the service name exists in the local HOSTS file, the user equipment does not need to interact with the DNS server according to a network protocol; instead, the user equipment directly obtains a corresponding IP address and initiates communication with a serving-end device. This can avoid the delay caused by the query in the DNS server. However, the user equipment needs to access services of many applications every day. This requires static configuration of a very large HOSTS file, resulting in large configuration overheads. In addition, many service names are difficult to be statically preconfigured, and are obtained dynamically by the user equipment in a communication or processing process, for example, obtained by parsing a link of a picture, code, or the like.

In another existing solution, user equipment locally buffers a mapping relationship that is between a service name and an IP address (a globally unique IP address) and that is obtained through the query in the DNS server for a first time. In this way, when accessing the service name next time, the user equipment does not need to query the DNS server again, and may directly extract the corresponding IP address from a local buffer. The mapping relationship may be buffered in the user equipment for a long time by increasing a time to live of a record of the mapping relationship between the service name and the IP address in the local buffer. However, based on this solution, the DNS server still needs to be queried when the service name is accessed for a first time, and a delay still exists. In addition, if a buffer is allowed to persist for a long time without expiration, buffers accumulate continuously in the user equipment, and a very large mapping relationship table is maintained locally, increasing overheads of the user equipment. If a buffer is allowed to expire quickly, the user equipment needs to query the DNS server again after the buffer expires, causing a delay.

Based on the foregoing problems, the embodiments of this application provide service obtaining and providing methods, and related devices.

Figure 3:
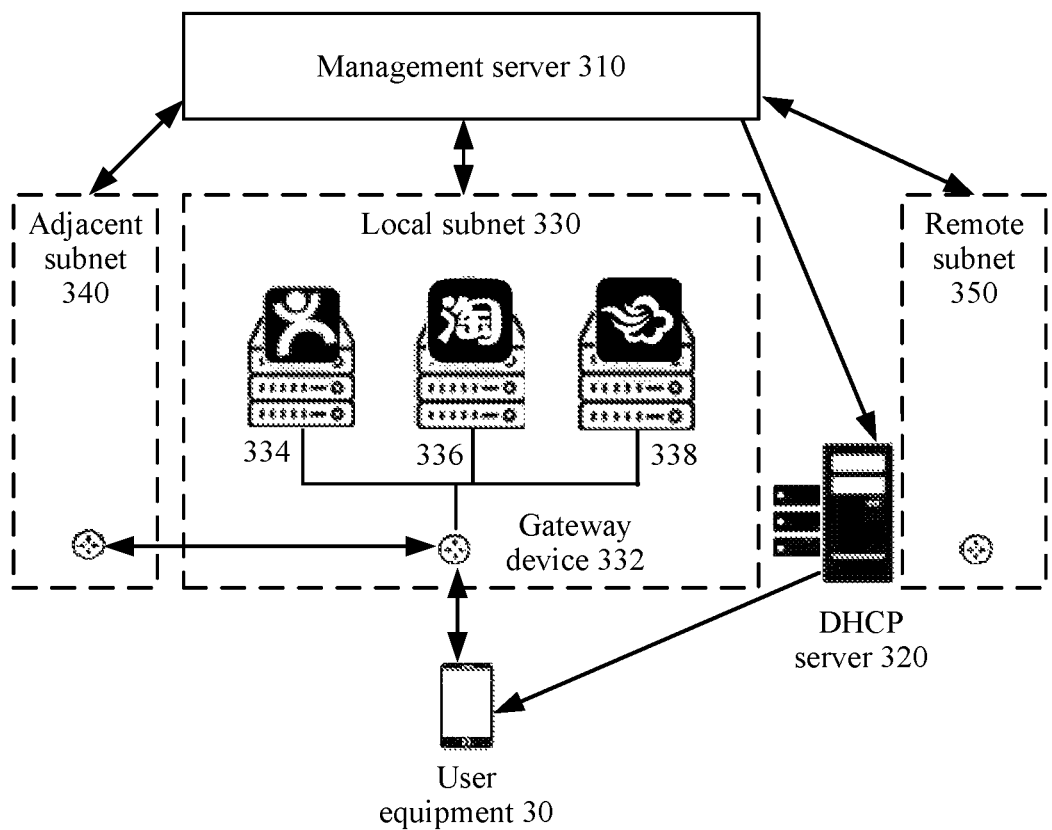
FIG. 3 is a schematic diagram of a service obtaining system architecture according to an embodiment of this application.

FIG. 3 is a schematic diagram of a service obtaining system architecture 300 according to an embodiment of this application. The system architecture may be constructed by an operator (for example, China Mobile, China Unicom, or China Telecom), and is used as an open platform. A service provider (for example, Dazhongdianping, Taobao, or Moji Weather) is allowed to deploy a service in an MEC subnet. After subscribing to the operator, the service provider can deploy a service of the service provider in the system architecture. The system architecture 300 may be applied in an MEC scenario, may also be applied in a content delivery network (CDN) scenario, and may further be applied in another scenario. This is not limited in this embodiment of this application.

As shown in FIG. 3, the system architecture 300 may include a management server 310. The management server 310 is configured to provide the service provider with an interface for service deployment and registration, detect validity of a service name (for example, a domain name or a content name) of a deployed service, and detect and process a service identifier (serviceID) conflict problem or an IP address conflict problem to be mentioned below in this specification. When applied in the MEC scenario, the management server 310 may be an MEC deployment and registration server. When applied in the CDN scenario, the management server 310 may be a CDN deployment and registration server.

The system architecture 300 may include a dynamic host configuration protocol (DHCP) server 320. In addition to conventional functions such as centralized management and IP address allocation, the DHCP server further supports publishing, to user equipment, of an MEC prefix and a conflict list to be mentioned below in this specification.

The system architecture 300 may include at least one subnet, where the subnet is alternatively referred to as a station. For example, FIG. 3 shows three subnets, including a local subnet 330, an adjacent (Nearby) subnet 340, and a remote subnet 350. From a perspective of user equipment, a subnet at a shortest topological distance is a local subnet, a nearby subnet that interacts with the local subnet is referred to as an adjacent subnet, and a substance at a long distance that does not interact with the local subnet is a remote subnet. When applied in the MEC scenario, these subnets are a local MEC subnet, a nearby MEC subnet, and a remote MEC subnet. When applied in the CDN scenario, these subnets are CDN stations or CDN subnets.

The foregoing subnet may include a gateway device and a serving-end device, and the serving-end device may also be referred to as a server. The local subnet 330 is used as an example. The local subnet 330 includes a gateway device 332, configured to support routing and forwarding, especially routing and forwarding based on a service ID or an IP address in this embodiment of this application. The subnet 330 includes a serving-end device 334, a serving-end device 336, a serving-end device 338, and the like, which are respectively configured to deploy services provided by service providers, such as Dazhongdianping, Taobao, and Taobao.

The system architecture 300 may provide a service for user equipment 30 shown in FIG. 3.

Figure 4:
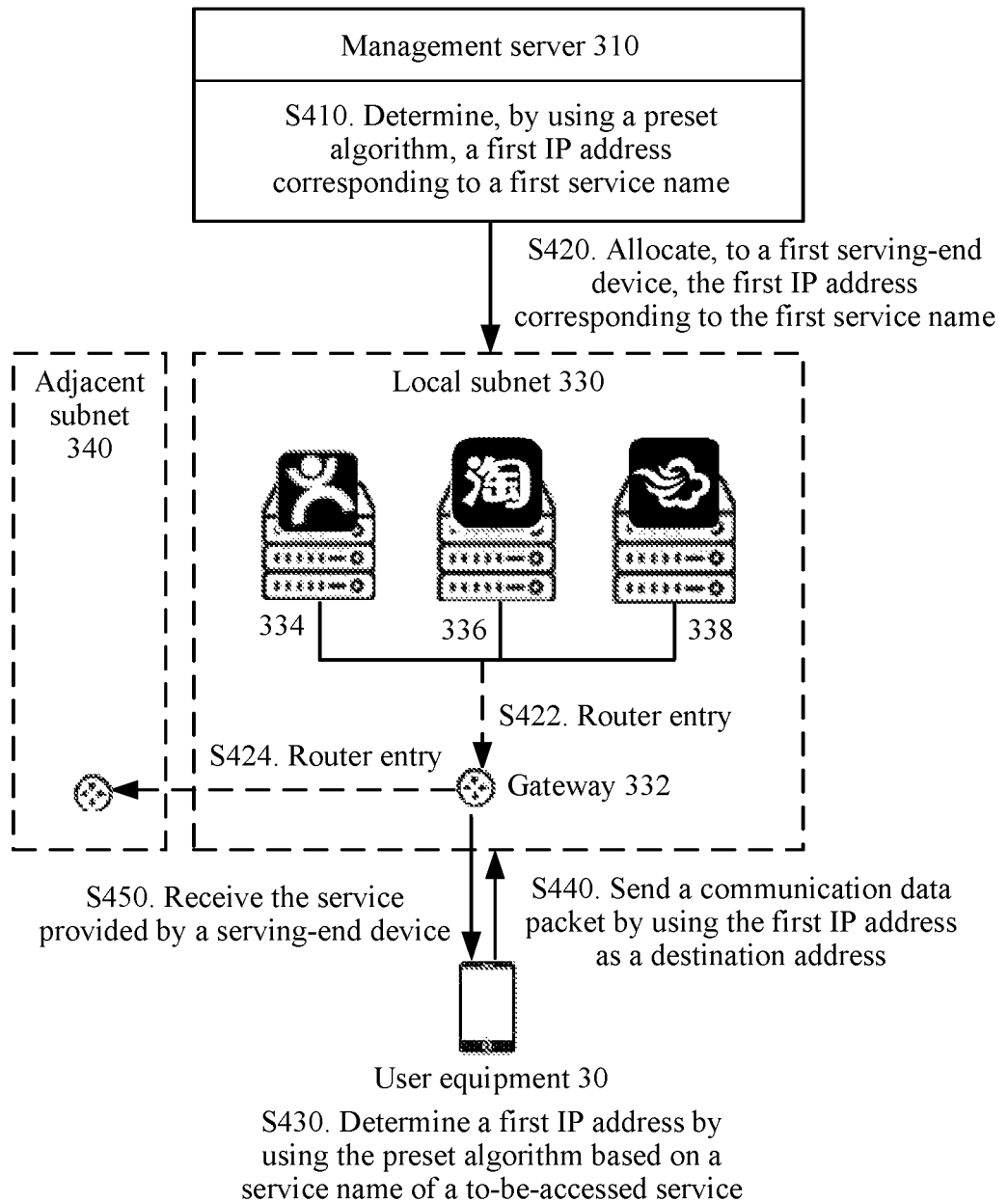
FIG. 4 is a schematic flowchart of a service obtaining method according to an embodiment of this application.

FIG. 4 is a schematic flowchart of a service obtaining method 400 according to an embodiment of this application. As shown in FIG. 4, the service obtaining method 400 includes the following steps.

S410. A management server determines, by using a preset algorithm, a first IP address corresponding to a first service name.

S420. The management server allocates, to a first serving-end device, the first IP address corresponding to the first service name, where the first serving-end device provides a service whose name is the first service name.

S430. User equipment determines a first IP address by using the preset algorithm based on a service name of a to-be-accessed service. For example, the service name may be the first service name, and the first IP address may be the first IP address corresponding to the first service name.

S440. The user equipment sends a communication data packet by using the first IP address as a destination address. It should be understood that the first IP address is the first IP address corresponding to the first service name.

S450. The user equipment receives the service provided by a serving-end device. It should be understood that the serving-end device may be a first serving-end device.

According to the service obtaining method in this embodiment of this application, the management server determines a corresponding first IP address for each service name by using the preset algorithm, and allocates the first IP address to a first serving-end device corresponding to the service name. The user equipment determines the first IP address for the service name of the to-be-accessed service by using the same preset algorithm, sends the communication data packet by using the first IP address as the destination address, and receives the service provided by the serving-end device. This prevents a long delay caused because the user equipment queries the IP address from a DNS server, and can reduce an overall delay of an application service, thereby improving user experience.

It should be understood that the user equipment sends a communication data packet in S440 may be understood as that the user equipment sends the communication data packet to a serving-end device in a subnet by using a gateway device. In actual implementation, the user equipment sends the communication data packet to a gateway device, for example, a gateway device in a nearest subnet.

In comparison with the two existing solutions described above, in this embodiment of this application, a mapping relationship does not need to be preconfigured statically in the user equipment, and massive mapping relationships (for example, mapping relationships in a HOSTS file or mapping relationships in a buffer) do not need to be maintained locally. In addition, when the user equipment accesses a service name for a first time, a long delay caused by querying an IP address from the DNS server can still be avoided.

Optionally, in an embodiment, before S430, the method 400 may further include the following steps.

S422. A gateway device receives a router entry, where the router entry is used to indicate a correspondence between a serving-end device and a first IP address.

S424. The gateway device sends the router entry to another gateway device.

The gateway device generates the router entry indicating the correspondence between the serving-end device and the first IP address, and indicates the router entry, to route and forward, based on the router entry, the communication data packet sent by the user equipment.

Specifically, a service provider may rent a computing resource of a subnet in the system architecture in the embodiments of this application. The computing resource may include resources such as a server, a virtual machine, and a container, which are collectively referred to as a serving-end device. The service provider registers, with the system architecture, a service name of a service provided by the service provider. The management server determines a corresponding IP address for each service name by using the preset algorithm, and binds the IP address to a serving-end device rent by the service provider. A gateway device in a subnet may generate a router entry for a serving-end device in the current subnet and an IP address corresponding to the serving-end device, where the router entry is alternatively referred to as a forwarding entry. The gateway device notifies an adjacent (or a nearby) subnet of the router entry, so that the serving-end device in the current subnet can be routed from the adjacent (or nearby) subnet. In this way, when the user equipment needs to access a service and initiate a connection to a serving-end device corresponding to a service name of the service, the user equipment may directly locally generate an IP address corresponding to the service name, and initiate a communication request to a subnet by using the IP address as a destination address of a communication data packet. After receiving the communication data packet, the gateway device in the subnet may directly search for a router entry by using the IP address in the communication data packet, and forward the communication data packet to a corresponding serving-end device. In this way, a process in which the user equipment queries the IP address from the DNS server can be prevented; instead, the user equipment initiates communication directly, thereby reducing a delay.

Optionally, that a management server determines, by using a preset algorithm, a first IP address corresponding to a first service name in S410 may include that the management server determines, by applying at least one of a hash algorithm and an encryption algorithm to the first service name, a first service identifier (serviceID) corresponding to the first service name; and the management server determines, based on the first service identifier corresponding to the first service name, the first IP address corresponding to the first service name. Correspondingly, that user equipment determines a first IP address by using the preset algorithm based on a service name of a to-be-accessed service in S430 includes that the user equipment determines a service identifier by applying the at least one of the hash algorithm and the encryption algorithm to the service name; and the user equipment determines the first IP address based on the service identifier. For example, the service name may be the first service name, the service identifier may be the first service identifier, and the first IP address may be the first IP address corresponding to the first service name.

Specifically, in some embodiments, the preset algorithm for determining the first service identifier (or the first IP address) corresponding to the first service name may be the hash algorithm, may be the encryption algorithm, or may be an algorithm obtained by combining the hash algorithm and the encryption algorithm. It should be understood that when the hash algorithm and/or the encryption algorithm are/is used to calculate a service identifier, the algorithm is simple and there is a relatively low probability that service identifiers (or IP addresses) obtained after calculation are repeated.

Specifically, that the management server determines, based on the first service identifier corresponding to the first service name, the first IP address corresponding to the first service name may include that the management server adds a prefix before the first service identifier corresponding to the first service name, to determine the first IP address corresponding to the first service name. The prefix may be an MEC prefix in the MEC scenario. In the CDN scenario, the prefix may be a routable prefix of a CDN in a wide area network.

Optionally, that a management server determines, by using a preset algorithm, a first Internet protocol IP address corresponding to a first service name in S410 may include that the management server directly generates, by applying a hash algorithm to the first service name, the first IP address corresponding to the first service name.

Certainly, in this embodiment of this application, the first IP address may be alternatively determined by using another algorithm. This is not limited in this embodiment of this application. Optionally, in some embodiments, the preset algorithm for determining the first service identifier (or the first IP address) corresponding to the first service name may be a clipping algorithm. To be specific, the first service identifier is one part or several parts of the first service name, and the part or parts are clipped out of the first service name according to a previously specified clipping rule, to obtain the first service identifier. For example, several consecutive bits are clipped out of the first service name, to obtain the first service identifier. In a specific example, the $11^{th}$ to the $40^{th}$ bits are consecutively clipped out of the first service name, to obtain the first service identifier. A prefix may be added before the first service identifier, or a suffix may be added after the first service identifier, to determine the first IP address corresponding to the first service name. For another example, a plurality of groups of consecutive bits are separately clipped out of the first service name, and then spliced to obtain the first service identifier. In a specific example, the $11^{th}$ to the $20^{th}$ bits and the $31^{st}$ to the $40^{th}$ bits are clipped out of the first service name, and then spliced to obtain the first service identifier. The first service identifier may be obtained by connecting the clipped $11^{th}$ to $20^{th}$ bits and $31^{st}$ to $40^{th}$ bits by using a specific connection character or string, or may be obtained by directly splicing the clipped bits. A prefix may be added before the first service identifier that is obtained through splicing, or a suffix may be added after the first service identifier, to determine the first IP address corresponding to the first service name. Alternatively, the first service identifier and the first IP address may be obtained by using other clipping and splicing manners. This is not limited in this embodiment of this application. Correspondingly, that a management server determines, by using a preset algorithm, a first IP address corresponding to a first service name may include that the management server clips a part out of the first service name, to obtain the first service identifier corresponding to the first service name; and the management server determines, based on the first service identifier corresponding to the first service name, the first IP address corresponding to the first service name. It should be understood that when a service identifier is clipped out of a service name, calculation is simple and there is a relatively low probability that service identifiers (or IP addresses) obtained after calculation are repeated.

It should be understood that the first service identifier and/or the first IP address may alternatively be obtained by the user equipment based on the first service name. Correspondingly, that user equipment determines a first IP address by using the preset algorithm based on a service name of a to-be-accessed service may include that the user equipment clips a part out of the service name, to obtain a service identifier corresponding to the service name; and the user equipment determines, based on the service identifier corresponding to the service name, the first IP address corresponding to the service name.

Optionally, the first IP address may be an Internet protocol version 6 (internet protocol version 6, IPv6) address. A length of the IPv6 address is 128 bits, which can meet a requirement of an enormous quantity of services. Certainly, the first IP address may alternatively be an Internet protocol version 4 (internet protocol version 4, IPv4) address or an IP address of another version. This is not limited in this embodiment of this application.

Optionally, before the management server allocates, to the first serving-end device, the first IP address corresponding to the first service name in S420, the method 400 may further include: determining, by the management server, that the first IP address corresponding to the first service name is not occupied by a serving-end device other than the first serving-end device. Alternatively, optionally, before the management server allocates, to the first serving-end device, the first IP address corresponding to the first service name in S420, the method 400 may further include: determining, by the management server, that the first service identifier corresponding to the first service name is not occupied by a serving-end device other than the first serving-end device. Correspondingly, before the user equipment determines the first IP address by using the preset algorithm based on the service name of the to-be-accessed service in S430, the method 400 may further include: determining, by the user equipment, that the service name is not in a conflict list, where the conflict list includes a correspondence between at least one pair of a service name and a first IP address. Alternatively, optionally, before the user equipment determines the first IP address by using the preset algorithm based on the service name of the to-be-accessed service in S430, the method 400 may further include: determining, by the user equipment, that the service name is not in a conflict list, where the conflict list includes a correspondence between at least one pair of a service name and a service identifier. The service name may be the first service name. If the first IP address (or service identifier) corresponding to the first service name has already been occupied by another serving-end device, it indicates that a conflict occurs.

In this embodiment of this application, a case in which a conflict occurs is specially handled. Correspondingly, the method 400 may further include: determining, by the management server by using the preset algorithm, a first IP address corresponding to a second service name, where the first IP address corresponding to the first service name is the same as the first IP address corresponding to the second service name; determining, by the management server, that the first IP address corresponding to the second service name has already been occupied by the first serving-end device; allocating, by the management server, a third IP address to a second serving-end device, where the second serving-end device provides a service whose name is the second service name; and adding, by the management server, the second service name and the third IP address to the conflict list.

Specifically, a same service ID may be generated for two different service names by using the preset algorithm. As a result, the two different service names cannot be distinguished. To resolve a conflict problem, whether a conflict exists needs to be detected during service name registration. Once a conflict occurs, the conflict is resolved by using the conflict list. The conflict list may be configured in a DHCP server. The DHCP server sends, by using a protocol such as a DHCP version 6 (DHCPv6) protocol, a neighbor discovery (ND) protocol, or a CDN application layer protocol, the conflict list to user equipment that may access the system architecture. Correspondingly, the conflict list used by the user equipment may be sent by the DHCP server.

In this embodiment of this application, some services that the user equipment needs to access may not be deployed in the system architecture. If a particular service is not deployed in the system architecture, a service ID and an IP address determined by the user equipment cannot be routed in a network, resulting in a service connection failure. After detecting the failure, the user equipment returns to a DNS resolution manner, and re-initiates a connection after obtaining an IP address through a query in the DNS server. In this case, extra time is needed for the user equipment to detect the connection failure. This results in a longer delay than a delay of directly using the DNS resolution manner.

In this embodiment of this application, the user equipment is allowed to query an IP address from the DNS server when initiating communication by using a locally generated IP address as a destination address. In this way, even if a particular service is not deployed in the system architecture, delay experience not inferior to that in the conventional DNS resolution manner can still be obtained. Correspondingly, when the user equipment determines the first IP address by using the preset algorithm based on the service name of the to-be-accessed service, the method 400 may further include: sending, by the user equipment, a query request to the DNS server, where the query request is used to request a second IP address of the serving-end device that provides the service.

The serving-end device has already been bound to an IP address. Therefore, optionally, that a gateway device receives a router entry in S422 may be that the gateway device receives the router entry sent by the serving-end device. In addition, the management server generates the IP address, and binds the serving-end device and the IP address. Therefore, optionally, that a gateway device receives a router entry may be alternatively that the gateway device receives the router entry sent by the management server.

The following describes in detail a procedure of service obtaining and providing methods according to the embodiments of this application by using a specific example in an MEC scenario.

Figure 5A:
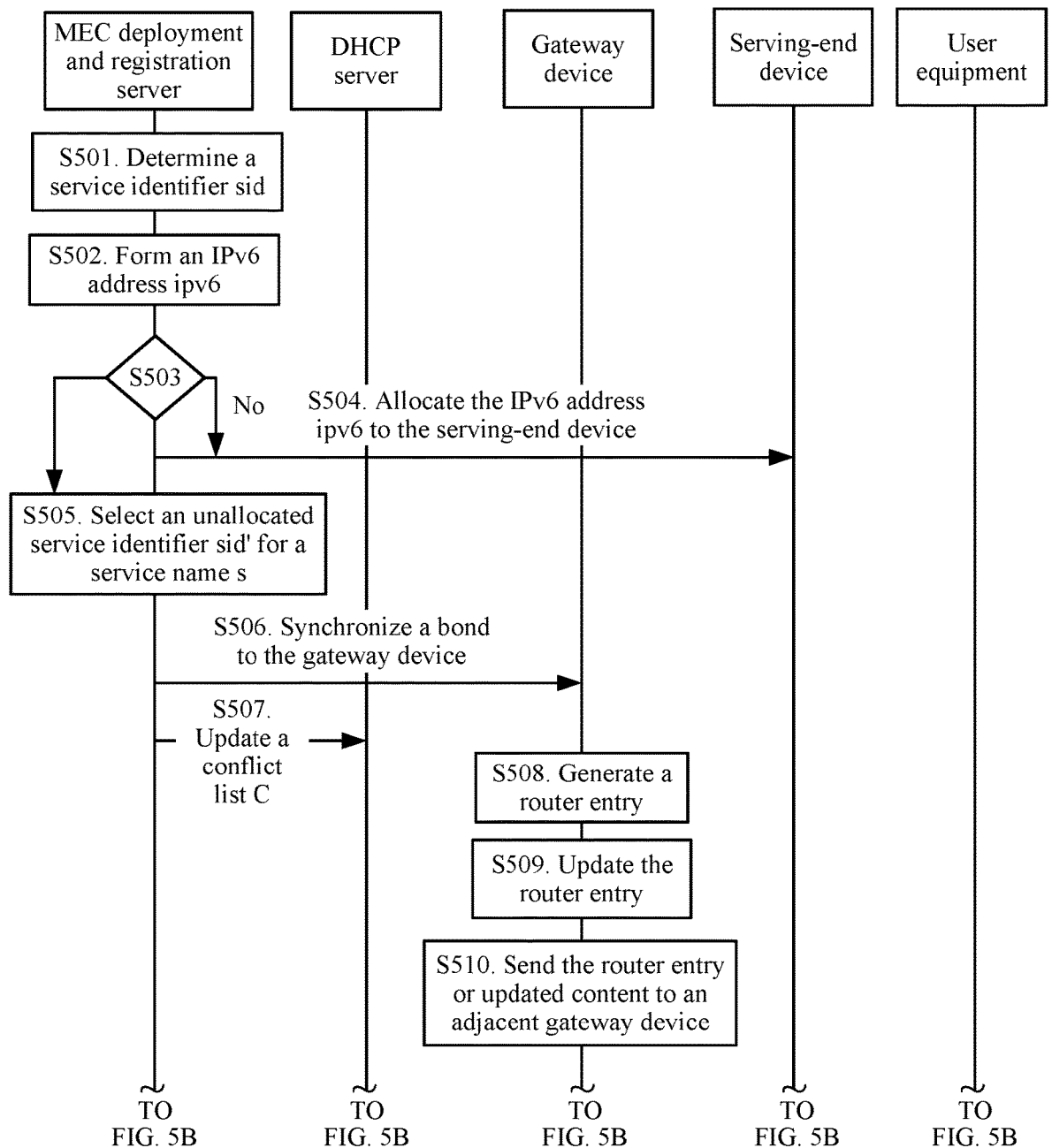
FIG. 5A and FIG. 5B are a schematic flowchart of a service obtaining method according to another embodiment of this application.
Figure 5B:
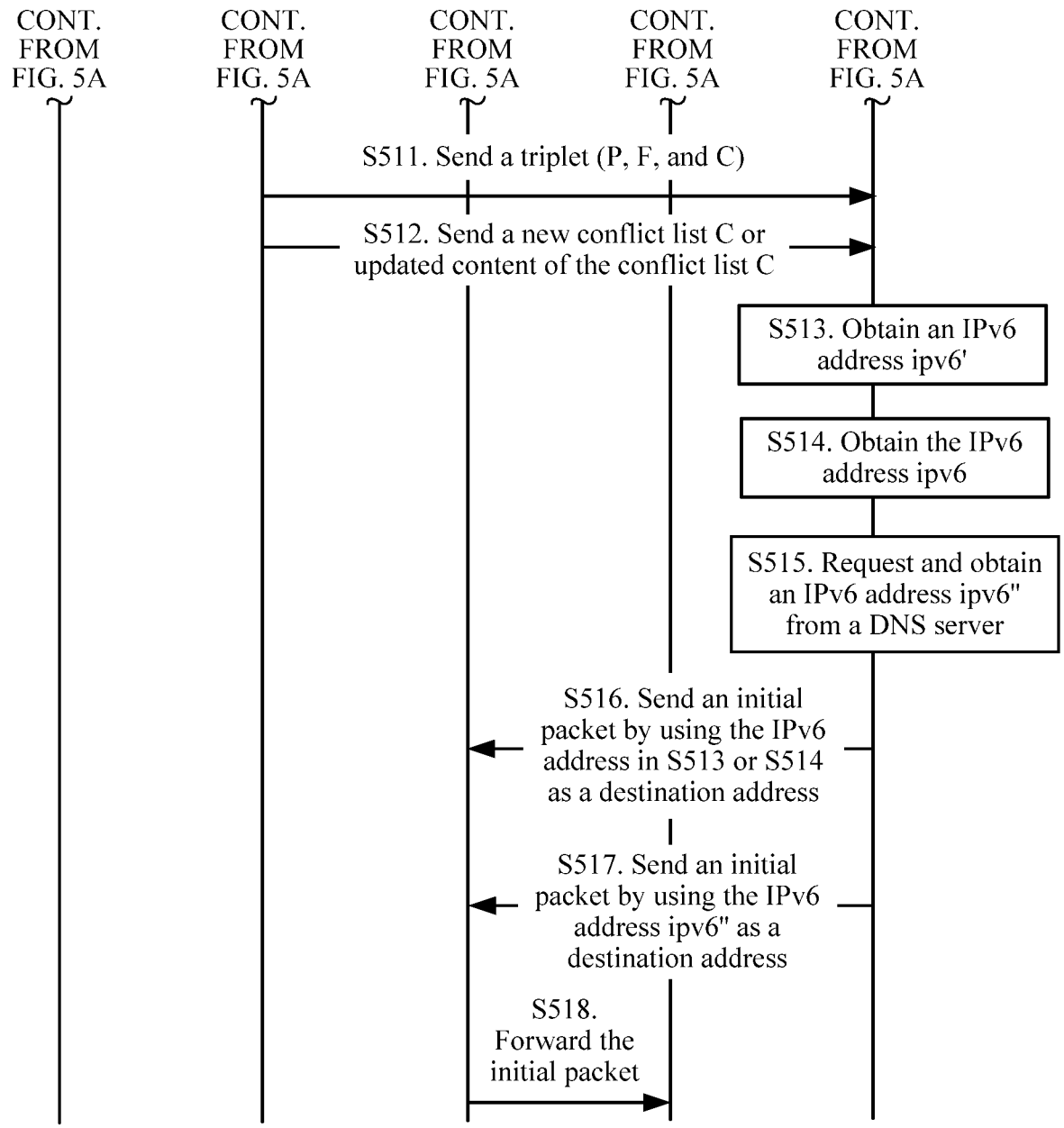

FIG. 5A and FIG. 5B are a schematic flowchart of a service obtaining method 500 according to another embodiment of this application. As shown in FIG. 5A and FIG. 5B, the method 500 may include the following subprocedures and steps.

Subprocedure 1: A service provider requests a system architecture to bind a service whose service name is s to a serving-end device in a subnet, and an MEC deployment and registration server verifies the service. The MEC deployment and registration server may allocate an address to the serving-end device in the following steps.

S501. The MEC deployment and registration server determines a service identifier sid for the service name s based on a hash algorithm F( ), where sid=F(s), a length of sid is 128−L, and L is a length of an MEC prefix p.

S502. The MEC deployment and registration server connects the MEC prefix p and the service identifier sid, to form an IPv6 address ipv6, where ipv6=p∥sid, and ∥ is a bit string connection character.

S503. The MEC deployment and registration server detects whether the service identifier sid or the IPv6 address ipv6 is allocated. If the service identifier sid or the IPv6 address ipv6 is not allocated, S504 is performed. Otherwise, step S505 is performed.

S504. The MEC deployment and registration server allocates the IPv6 address ipv6 to the serving-end device.

S505. The MEC deployment and registration server selects an unallocated service identifier sid' for the service name s, where correspondingly, an IPv6 address ipv6'=p∥sid'; allocates the IPv6 address ipv6' to the serving-end device; and adds (the service name s, the service identifier sid', and the IPv6 address ipv6') to a conflict list C. Certainly, the MEC deployment and registration server may alternatively add (the service name s and the service identifier sid') to a conflict list C, or may add (the service name s and the IPv6 address ipv6') to a conflict list C.

S506. The MEC deployment and registration server synchronizes a bond between the service identifier sid or the IPv6 address ipv6 (or the service identifier sid or the IPv6 address ipv6) and the serving-end device to a gateway device in an MEC subnet. Alternatively, the serving-end device notifies a gateway device in an MEC subnet of the service identifier sid or the IPv6 address ipv6 (or the service identifier sid or the IPv6 address ipv6) by using an ND protocol.

S507. If the conflict list C is updated, the MEC deployment and registration server synchronizes the updated conflict list C to a DHCP server.

Subprocedure 2: Gateway devices in MEC subnets exchange router entries. The following steps may be included.

S508. A gateway device (also referred to as a routing and forwarding node) in an MEC subnet generates a router entry, where the router entry is used to indicate a correspondence between a serving-end device in the MEC subnet and the service identifier sid and/or the IPv6 address ipv6.

S509. If the gateway device discovers the local router entry is updated or receives a router entry or updated content of a router entry from another gateway device, the gateway device calculates an optimal route according to a routing policy and/or an algorithm, and updates the local router entry.

S510. The gateway device sends the router entry or updated content of the router entry to an adjacent (or nearby) gateway device by using a protocol such as a DHCPv6 or an ND protocol.

Subprocedure 3: User equipment accesses a network (or accesses the system architecture). The following steps may be included.

S511. When accessing the network, the user equipment may obtain a triplet from the network by using the protocol such as the DHCPv6 protocol or the ND protocol or an extension of the protocol, where the triplet may include the MEC prefix p for determining the IPv6 address, the hash algorithm F( ) for determining the service ID, and the conflict list C, that is, the triplet is (p, F, C); and the triplet obtained from the network may be a triplet obtained from the DHCP server.

S512. After accessing the network, if the conflict list C is updated, the user equipment may obtain updated content of the conflict list C from the network by using the protocol such as the DHCPv6 protocol or the ND protocol or the extension of the protocol, where a new conflict list C or the updated content of the conflict list C obtained from the network may be a new conflict list C or the updated content of the conflict list C obtained from the DHCP server.

Subprocedure 4: When the user equipment needs to access the service name s, the user equipment first obtains the corresponding IPv6 address of the service name s in the system architecture. This subprocedure may include the following steps:

S513. If the service name s is in the conflict list C, the user equipment determines the IPv6 address by using the service ID corresponding to the service name s in the conflict list C, or the user equipment uses the IPv6 address ipv6' corresponding to the service name s in the conflict list C. Otherwise, S514 is performed.

S514. The user equipment calculates the IPv6 address ipv6 corresponding to the service name s by using p∥F(s).

S515. When performing S513 and S514, the user equipment sends a query request to a DNS server; and obtains, from a response of the DNS server, an IPv6 address ipv6" corresponding to the service name s.

Subprocedure 5: The user equipment sends a communication data packet based on the IPv6 address. The following steps may be included.

S516. The user equipment does not need to wait for the response in step S515, and may send a communication data packet to a gateway device in a nearest MEC subnet by using the IPv6 address in step S513 or step S514 as a destination address, where the communication data packet may be an initial packet.

S517. If the initial packet in step S516 is unreachable (for example, timeout or an error occurs), and the response in step S515 has been received, the user equipment attempts to send a communication data packet to the gateway device in the nearest MEC subnet again by using the IPv6 address ipv6" in the response.

Subprocedure 6: The communication data packet is forwarded. The following step may be included.

S518. The gateway device forwards the communication data packet (which may be an initial packet) of the user equipment to the corresponding serving-end device based on the router entry generated in the subprocedure 2.

It should be understood that the steps in the method 500 are not mandatory, or are not necessarily performed in the foregoing sequence.

The foregoing describes the service obtaining and providing methods provided in the embodiments of this application. The following describes user equipment, a management server, and a gateway device provided in the embodiments of this application.

Figure 6:
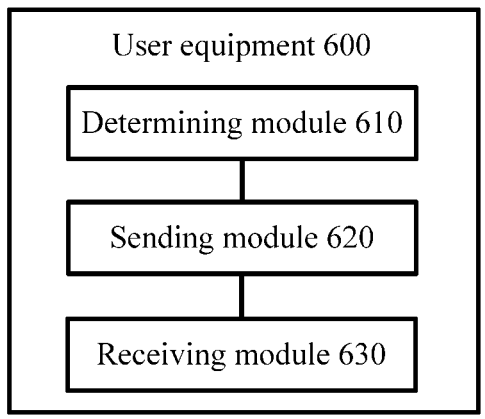
FIG. 6 is a schematic block diagram of user equipment according to an embodiment of this application.

FIG. 6 is a schematic block diagram of user equipment 600 according to an embodiment of this application. The user equipment 600 includes a determining module 610, a sending module 620, and a receiving module 630. The determining module 610 is configured to determine a first Internet protocol IP address by using a preset algorithm based on a service name of a to-be-accessed service. The sending module 620 is configured to send a communication data packet by using the first IP address determined by the determining module 610 as a destination address. The receiving module 630 is configured to receive the service provided by a serving-end device.

In this embodiment of this application, the user equipment determines the IP address for the service name of the to-be-accessed service by using the preset algorithm, sends the communication data packet by using the IP address as a destination address, and receives the service provided by the serving-end device. This prevents a long delay caused because the user equipment queries the IP address from a DNS server, and can reduce an overall delay of an application service, thereby improving user experience.

Optionally, in an embodiment, the determining module 610 is specifically configured to: determine a service identifier by applying at least one of a hash algorithm and an encryption algorithm to the service name; and determine the first IP address based on the service identifier.

Optionally, in an embodiment, the determining module 610 is specifically configured to: clip a part out of the service name, to obtain a service identifier corresponding to the service name; and determine, based on the service identifier corresponding to the service name, the first IP address corresponding to the service name.

Optionally, in an embodiment, the determining module 610 is further specifically configured to: before determining the first IP address by using the preset algorithm based on the service name of the to-be-accessed service, determine that the service name is not in a conflict list, where the conflict list includes a correspondence between at least one pair of a service name and a first IP address.

Optionally, in an embodiment, the conflict list is sent by a dynamic host configuration protocol DHCP server.

Optionally, in an embodiment, when the determining module 610 determines the first IP address by using the preset algorithm based on the service name of the to-be-accessed service, the sending module 620 is further configured to send a query request to the domain name system DNS server, where the query request is used to request a second IP address of the serving-end device that provides the service.

Optionally, in an embodiment, the first IP address is an IPv6 address.

Figure 7:
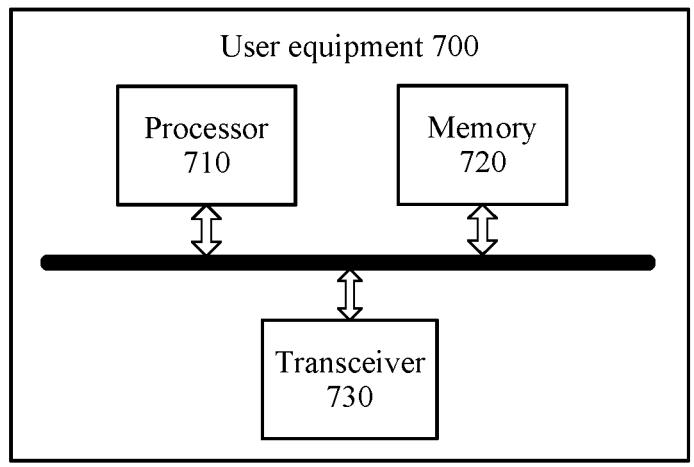
FIG. 7 is a schematic block diagram of user equipment according to another embodiment of this application.

FIG. 7 is a schematic block diagram of user equipment 700 according to an embodiment of this application. The user equipment 700 shown in FIG. 7 may include a processor 710 and a memory 720. The memory 720 stores a computer instruction. When the processor 710 executes the computer instruction, the user equipment 700 is enabled to perform the following steps: determining a first Internet protocol IP address by using a preset algorithm based on a service name of a to-be-accessed service; sending a communication data packet by using the first IP address as a destination address; and receiving the service provided by a serving-end device.

Optionally, in an embodiment, when the processor 710 executes the computer instruction, the user equipment 700 is enabled to specifically perform the following steps: determining a service identifier by applying at least one of a hash algorithm and an encryption algorithm to the service name; and determining the first IP address based on the service identifier.

Optionally, in an embodiment, when the processor 710 executes the computer instruction, the user equipment 700 is enabled to specifically perform the following steps: clipping a part out of the service name, to obtain a service identifier corresponding to the service name; and determining, based on the service identifier corresponding to the service name, the first IP address corresponding to the service name.

Optionally, in an embodiment, before the determining a first IP address by using a preset algorithm based on a service name of a to-be-accessed service, the processor 710 is further configured to execute the computer instruction to enable the user equipment 700 to perform the following step: determining that the service name is not in a conflict list, where the conflict list includes a correspondence between at least one pair of a service name and a first IP address.

Optionally, in an embodiment, the conflict list is sent by a dynamic host configuration protocol DHCP server.

Optionally, in an embodiment, when the processor 710 determines the first IP address by using the preset algorithm based on the service name of the to-be-accessed service, the processor 710 is further configured to execute the computer instruction, to enable the user equipment 700 to perform the following step: sending a query request to a domain name system DNS server, where the query request is used to request a second IP address of the serving-end device that provides the service.

Optionally, in an embodiment, the first IP address is an IPv6 address.

Optionally, the user equipment 700 may further include a transceiver 730, configured to receive or send data.

It should be understood that the user equipment 600 shown in FIG. 6 or the user equipment 700 shown in FIG. 7 may be configured to perform operations or procedures in the foregoing method embodiments, and operations and/or functions of the modules or components in the user equipment 600 or the user equipment 700 are respectively intended for implementing corresponding procedures in the foregoing method embodiments. For brevity, details are not described herein again.

Figure 8:
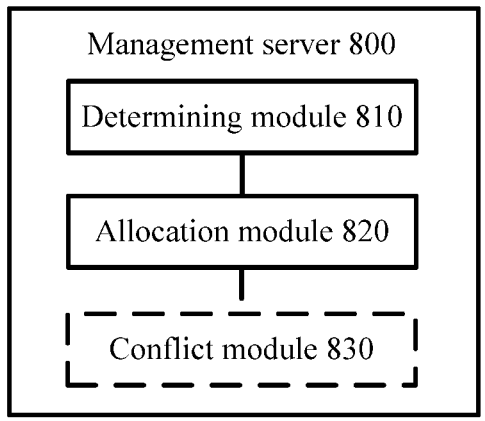
FIG. 8 is a schematic block diagram of a management server according to an embodiment of this application.

FIG. 8 is a schematic block diagram of a management server 800 according to an embodiment of this application. The management server 800 includes a determining module 810 and an allocation module 820. The determining module 810 is configured to determine, by using a preset algorithm, a first Internet protocol IP address corresponding to a first service name. The allocation module 820 is configured to allocate, to a first serving-end device, the first IP address that corresponds to the first service name and that is determined by the determining module 810, where the first serving-end device provides a service whose name is the first service name.

In this embodiment of this application, the management server determines a corresponding first IP address for each service name by using the preset algorithm, and allocates the first IP address to a first serving-end device corresponding to the service name. In this way, user equipment can determine a first IP address for a service name of a to-be-accessed service by using the same preset algorithm, sends a communication data packet by using the first IP address as a destination address, and receives the service provided by a serving-end device. This prevents a long delay caused because the user equipment queries the IP address from a DNS server, and can reduce an overall delay of an application service, thereby improving user experience.

Optionally, in an embodiment, the determining module 810 is specifically configured to: determine, by applying at least one of a hash algorithm and an encryption algorithm to the first service name, a first service identifier corresponding to the first service name; and determine, based on the first service identifier corresponding to the first service name, the first IP address corresponding to the first service name.

Optionally, in an embodiment, the determining module 810 is specifically configured to: clip a part out of the first service name, to obtain a first service identifier corresponding to the first service name; and determine, based on the first service identifier corresponding to the first service name, the first IP address corresponding to the first service name.

Optionally, in an embodiment, the management server 800 may further include a conflict module 830. The conflict module 830 is configured to: before the first IP address corresponding to the first service name is allocated to the first serving-end device, determine that the first IP address corresponding to the first service name is not occupied by a serving-end device other than the first serving-end device.

Optionally, in an embodiment, the determining module 810 is further configured to determine, by using the preset algorithm, a first IP address corresponding to a second service name, where the first IP address corresponding to the first service name is the same as the first IP address corresponding to the second service name. The allocation module 820 is further configured to: determine that the first IP address corresponding to the second service name has already been occupied by the first serving-end device; and allocate a third IP address to a second serving-end device, where the second serving-end device provides a service whose name is the second service name. The management server 800 may further include the conflict module 830. The conflict module 830 is configured to add the second service name and the third IP address to a conflict list.

Optionally, in an embodiment, the conflict list is configured in a DHCP server.

Optionally, in an embodiment, the first IP address is an IPv6 address.

Figure 9:
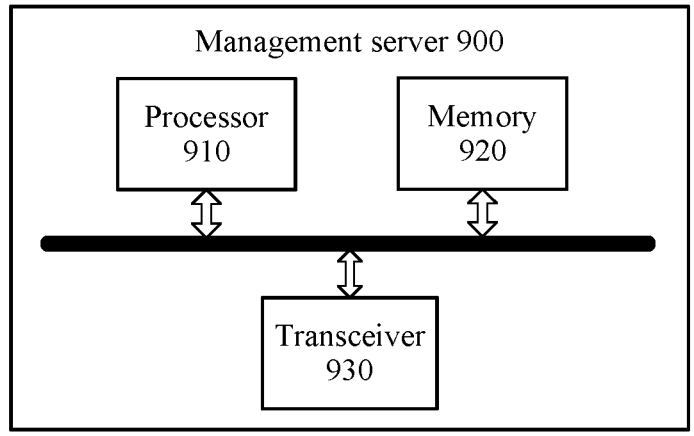
FIG. 9 is a schematic block diagram of a management server according to another embodiment of this application.

FIG. 9 is a schematic block diagram of a management server 900 according to an embodiment of this application. The management server 900 shown in FIG. 9 may include a processor 910 and a memory 920. The memory 920 stores a computer instruction. When the processor 910 executes the computer instruction, the management server 900 is enabled to perform the following steps: determining, by using a preset algorithm, a first Internet protocol IP address corresponding to a first service name; and allocating, to a first serving-end device, the first IP address corresponding to the first service name, where the first serving-end device provides a service whose name is the first service name.

Optionally, in an embodiment, when the processor 910 executes the computer instruction, the management server 900 is enabled to specifically perform the following steps: determining, by applying at least one of a hash algorithm and an encryption algorithm to the first service name, a first service identifier corresponding to the first service name; and determining, based on the first service identifier corresponding to the first service name, the first IP address corresponding to the first service name.

Optionally, in an embodiment, when the processor 910 executes the computer instruction, the management server 900 is enabled to specifically perform the following steps: clipping a part out of the first service name, to obtain a first service identifier corresponding to the first service name; and determining, based on the first service identifier corresponding to the first service name, the first IP address corresponding to the first service name.

Optionally, in an embodiment, before the allocating, to a first serving-end device, the first IP address corresponding to the first service name, the processor 910 is further configured to execute the computer instruction, to enable the management server 900 to perform the following step: determining that the first IP address corresponding to the first service name is not occupied by a serving-end device other than the first serving-end device.

Optionally, in an embodiment, the processor 910 is further configured to execute the computer instruction, to enable the management server 900 to perform the following steps: determining, by using the preset algorithm, a first IP address corresponding to a second service name, where the first IP address corresponding to the first service name is the same as the first IP address corresponding to the second service name; determining that the first IP address corresponding to the second service name has already been occupied by the first serving-end device; allocating a third IP address to a second serving-end device, where the second serving-end device provides a service whose name is the second service name; and adding the second service name and the third IP address to a conflict list.

Optionally, in an embodiment, the conflict list is configured in a DHCP server.

Optionally, in an embodiment, the first IP address is an IPv6 address.

Optionally, the management server 900 may further include a transceiver 930, configured to receive or send data.

It should be understood that the management server 800 shown in FIG. 8 or the management server 900 shown in FIG. 9 may be configured to perform operations or procedures in the foregoing method embodiments, and operations and/or functions of the modules or components in the management server 800 or the management server 900 are respectively intended for implementing corresponding procedures in the foregoing method embodiments. For brevity, details are not described herein again.

Figure 10:
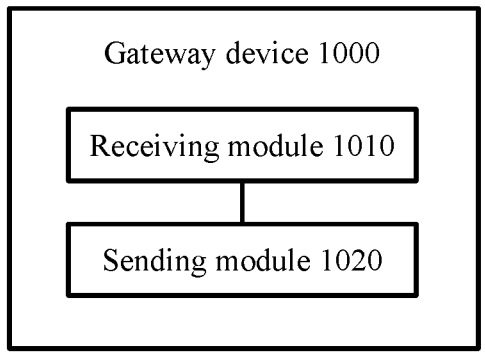
FIG. 10 is a schematic block diagram of a gateway device according to an embodiment of this application.

FIG. 10 is a schematic block diagram of a gateway device 1000 according to an embodiment of this application. The gateway device 1000 includes a receiving module 1010 and a sending module 1020. The receiving module 1010 is configured to receive a router entry, where the router entry is used to indicate a correspondence between a serving-end device and a first Internet protocol IP address. The sending module 1020 is configured to send the router entry to another gateway device.

In this embodiment of this application, the gateway device notifies an adjacent (or a nearby) subnet of the router entry, so that a serving-end device in a current subnet can be routed from the adjacent (or nearby) subnet. In this way, when user equipment needs to access a service and initiate a connection to a serving-end device corresponding to a service name of the service, the user equipment may directly locally generate an IP address corresponding to the service name, and initiate a communication request to a subnet by using the IP address as a destination address of a communication data packet.

Optionally, in an embodiment, the receiving module 1010 is specifically configured to receive a router entry sent by the serving-end device.

Optionally, in an embodiment, the receiving module 1010 is specifically configured to receive a router entry sent by a management server.

Optionally, in an embodiment, the first IP address is an IPv6 address.

Figure 11:
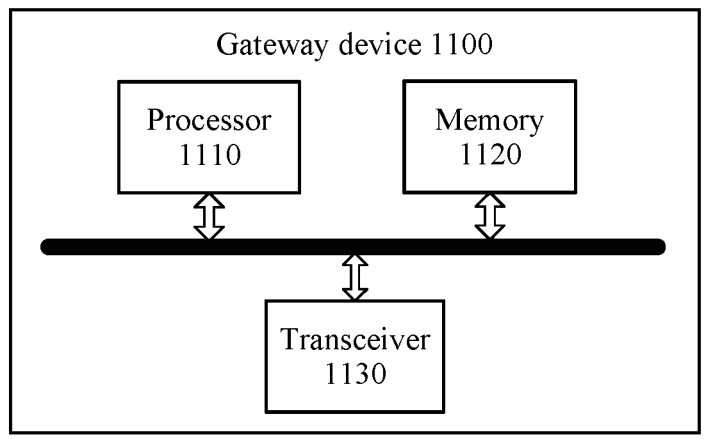
FIG. 11 is a schematic block diagram of a gateway device according to another embodiment of this application.

FIG. 11 is a schematic block diagram of a gateway device 1100 according to an embodiment of this application. The gateway device 1100 shown in FIG. 11 may include a processor 1110 and a memory 1120. The memory 1120 stores a computer instruction. When the processor 1110 executes the computer instruction, the gateway device 1100 is enabled to perform the following steps: receiving a router entry, where the router entry is used to indicate a correspondence between a serving-end device and a first Internet protocol IP address; and sending the router entry to another gateway device.

Optionally, in an embodiment, when the processor 1110 executes the computer instruction, the gateway device 1100 is enabled to specifically perform the following step: receiving a router entry sent by the serving-end device.

Optionally, in an embodiment, when the processor 1110 executes the computer instruction, the gateway device 1100 is enabled to specifically perform the following step: receiving a router entry sent by a management server.

Optionally, in an embodiment, the first IP address is an IPv6 address.

Optionally, the gateway device 1100 may further include a transceiver 1130, configured to receive or send data.

It should be understood that the gateway device 1000 shown in FIG. 10 or the gateway device 1100 shown in FIG. 11 may be configured to perform operations or procedures of the foregoing method embodiments, and operations and/or functions of the modules or components in the gateway device 1000 or the gateway device 1100 are respectively intended for implementing corresponding procedures in the foregoing method embodiments. For brevity, details are not described herein again.

It should be understood that the processor mentioned in the embodiments of this application may be a central processing unit (CPU); or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and used as an external cache. In an example instead of limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logical device, a discrete gate or a transistor logic device, or a discrete hardware component, the memory (storage module) is integrated into the processor.

It should be noted that the memory described in this specification includes but is not limited to these and any memory of another proper type.

An embodiment of this application further provides a computer readable storage medium. The computer readable storage medium stores an instruction. When the instruction is run on a computer, the computer is enabled to perform the service providing method in the foregoing method embodiments.

An embodiment of this application further provides a computer program product that includes an instruction. When a computer runs the instruction of the computer program product, the computer is enabled to perform the service providing method in the foregoing method embodiments.

It should be understood that determining a service identifier in the embodiments of this application may be understood as generating the service identifier or obtaining the service identifier through calculation, and determining an IP address may be understood as generating the IP address or obtaining the IP address through calculation.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, such as a server or a data center. The usable medium may be a magnetic medium (for example, a floppy disk, a hard disk, or a magnetic tape), an optical medium (for example, a high-density digital video disc (DVD), a semiconductor medium (for example, a solid-state drive (SSD)), or the like.

It should be understood that first, second, and various serial numbers in this specification are merely for purpose of distinction for ease of description, but are not intended to limit the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the various embodiments of this application. The execution sequences of the processes should be determined based on functions and internal logic of the processes, and should not be construed as any limitation on the implementation processes of the embodiments of this application. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units. In other words, the units may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by user equipment, a first Internet protocol (IP) address using a preset algorithm and based on a service name of a service, wherein the first IP address is allocated by a management server using the preset algorithm, and wherein determining, by the user equipment, the first IP address using the preset algorithm based on the service name of the service comprises:
      clipping, by the user equipment, a portion of the service name from the service name based on a clipping rule, to obtain a service identifier corresponding to the service name; and
      determining, by the user equipment based on the service identifier corresponding to the service name, the first IP address corresponding to the service name;
   sending, by the user equipment, a communication data packet using the first IP address as a destination address of the communication data packet; and
   receiving, by the user equipment, the service provided by a serving-end device.

2. The method according to claim 1, wherein before determining, by the user equipment, the first IP address using the preset algorithm based on the service name of the service, the method further comprises:
   determining, by the user equipment, that the service name is not in a conflict list, wherein the conflict list comprises one or more correspondences between one or more service names and one or more IP addresses.

3. The method according to claim 1, further comprising:
   in response to the user equipment determining the first IP address using the preset algorithm based on the service name of the service, sending, by the user equipment, a query request to a domain name system (DNS) server, wherein the query request requests a second IP address of the serving-end device that provides the service.

4. A method, comprising:
   determining, by a management server using a preset algorithm, a first Internet protocol (IP) address corresponding to a first service name, wherein determining, by the management server using the preset algorithm, the first IP address corresponding to the first service name comprises:
      determining, by the management server by applying at least a hash algorithm and an encryption algorithm to the first service name, a first service identifier corresponding to the first service name; and
      determining, by the management server based on the first service identifier corresponding to the first service name, the first IP address corresponding to the first service name; and
   allocating, by the management server to a first serving-end device, the first IP address corresponding to the first service name, wherein the first serving-end device provides a first service, the first service name is a name of the first service, and the preset algorithm is known to a user equipment and usable by the user equipment to determine the first IP address, to receive the first service.

5. The method according to claim 4, further comprising:
   before allocating, by the management server to the first serving-end device, the first IP address corresponding to the first service name, determining, by the management server, that the first IP address corresponding to the first service name is not occupied by a serving-end device other than the first serving-end device.

6. The method according to claim 4, further comprising:
   determining, by the management server using the preset algorithm, a second IP address corresponding to a second service name, wherein the first IP address corresponding to the first service name is the same as the second IP address corresponding to the second service name;
   determining, by the management server, that the second IP address corresponding to the second service name has already been occupied by the first serving-end device;
   allocating, by the management server, a third IP address to a second serving-end device, wherein the second serving-end device provides a second service, and a name of the second service is the second service name; and
   adding, by the management server, the second service name and the third IP address to a conflict list.

7. User equipment, comprising:
   a processor; and
   a non-transitory memory, wherein the non-transitory memory stores a computer instruction executable by the processor, and when the processor executes the computer instruction, the user equipment is caused to:
      determine a first Internet protocol (IP) address using a preset algorithm based on a service name of a service, wherein the first IP address is allocated by a management server using the preset algorithm, and wherein determining the first IP address using the preset algorithm based on the service name of the service comprises:
         clipping a portion of the service name from the service name based on a clipping rule, to obtain a service identifier corresponding to the service name; and
         determining, based on the service identifier corresponding to the service name, the first IP address corresponding to the service name;
      send a communication data packet using the first IP address as a destination address of the communication data packet; and
      receive the service provided by a serving-end device.

8. The user equipment according to claim 7, wherein when the processor executes the computer instruction, the user equipment is further caused to:
   before determining the first IP address using the preset algorithm based on the service name of the service, determining that the service name is not in a conflict list, wherein the conflict list comprises a one or more correspondences between one or more service names and one or more IP addresses.

9. The user equipment according to claim 7, wherein when the processor executes the computer instruction, the user equipment is further caused to:
   in response to determining the first IP address using the preset algorithm based on the service name of the service, send a query request to a domain name system (DNS) server, wherein the query request requests a second IP address of the serving-end device that provides the service.

\* \* \* \* \*